United States Patent [19]

Cather

[11] 4,359,228

[45] Nov. 16, 1982

[54] LINECUTTER SEAL, APPARATUS AND METHOD

[75] Inventor: Douglas A. Cather, Gastonia, N.C.

[73] Assignee: Garlock Inc., Longview, Tex.

[21] Appl. No.: 273,096

[22] Filed: Jun. 12, 1981

[51] Int. Cl.³ .............................................. F16J 15/54
[52] U.S. Cl. .......................................... 277/1; 277/32; 277/237 R; 277/DIG. 4
[58] Field of Search ................... 277/1, 32, 11, 237 R, 277/DIG. 4

[56] References Cited

U.S. PATENT DOCUMENTS

| | | | |
|---|---|---|---|
| 3,394,939 | 7/1968 | Mastro | 277/1 |
| 3,511,512 | 5/1970 | Wheelock | 277/237 |
| 3,545,770 | 12/1970 | Wheelock | 277/237 |
| 3,998,466 | 12/1976 | Kondo | 277/DIG. 4 |
| 4,106,778 | 8/1978 | Cormack | 277/1 |
| 4,218,813 | 8/1980 | Cather | 277/1 |
| 4,277,072 | 7/1981 | Forch | 277/DIG. 4 |

Primary Examiner—Robert I. Smith

[57] ABSTRACT

A linecutter article, apparatus and method wherein the linecutter is mounted adjacent a shaft seal cutting line to protect the shaft seal(s). The linecutter includes an annular ring of tough, low coefficient of fricton, abrasion-resistant, ultra-high molecular weight polyethylene or its equivalent in contact with the shaft and having a sharp linecutter edge facing outwardly. The ring is tough enough to cut monofilament fishing line but flexible enough to follow shaft runout and provides an additional seal.

24 Claims, 3 Drawing Figures

LINECUTTER SEAL, APPARATUS AND METHOD

TECHNICAL FIELD

This invention relates to linecutters and in one embodiment to linecutters mounted adjacent propshaft seals of small marine engines for cutting nylon fishing line to protect the propshaft seal(s).

BACKGROUND

It is current practice to use a formed metal linecutter adjacent the propshaft of small marine engines such as outboards, inboards and inboard-outboards, used for fishing. The purpose of the linecutter is to protect the propshaft seal(s) from nylon fishing line which may wrap around the propshaft. The inner diameter of the linecutter must be ground for two reasons: (1) to produce a sharp outward-facing edge to cut fishing line, and (2) to achieve a minimal shaft clearance with an exceptionally tight tolerance (±0.0005–0.0010 inches).

The linecutter shell is usually cup-shaped and the outer propshaft seal is pressed into it to form a seal-linecutter assembly. Therefore, the inside diameter-outside diameter concentricity of the metal linecutter must be held to 0.005 inch TIR (total indicator reading) or less. The major disadvantages of such known linecutters are cost, grooving of the shaft due to shaft runout, and generation of heat near the seal.

SUMMARY OF THE INVENTION

A linecutter seal, apparatus and method including an annular ring of tough, abrasion resistant, ultra-high molecular weight polyethylene or its equivalent, having an annular inside diameter shaft-contacting surface and an axially outer radial surface that meets the shaft-contacting surface at an acute angle forming a sharp linecutter edge riding on the shaft. The polyethylene ring is tough enough to cut nylon monofilament fishline, yet is preferably flexible enough to follow shaft runout and is non-abrasive thus virtually eliminating grooving of the shaft. Because of its flexibility and low abrasiveness, the polyethylene ring is designed with shaft interference eliminating the need for the tight tolerances needed on the prior art ground metal linecutter, and also producing an additional sealing effect on the shaft axially outside of the primary seal(s).

The polyethylene ring is preferably part of a molded unit including a metal shell and an elastomeric body with the ring being a liner on the inside diameter of the elastomeric body.

It is an object of the present invention to provide a linecutter seal, apparatus, and method that eliminates the above-mentioned problems in the prior art.

It is another object of the invention to provide a linecutter that eliminates shaft grooving, that does not overheat adjacent the propshaft seal(s), that is less expensive in eliminating a grinding operation and the need for tight tolerances and concentricity, and that, at the same time, provides an additional sealing effect on the shaft outside of the primary seal(s).

BRIEF DESCRIPTION OF THE DRAWINGS

The present invention will be more fully understood by reference to the following detailed description thereof, when read in conjunction with the attached drawings, wherein like reference numerals refer to like elements and wherein.

DETAILED DESCRIPTION OF THE INVENTION

Figure 1:
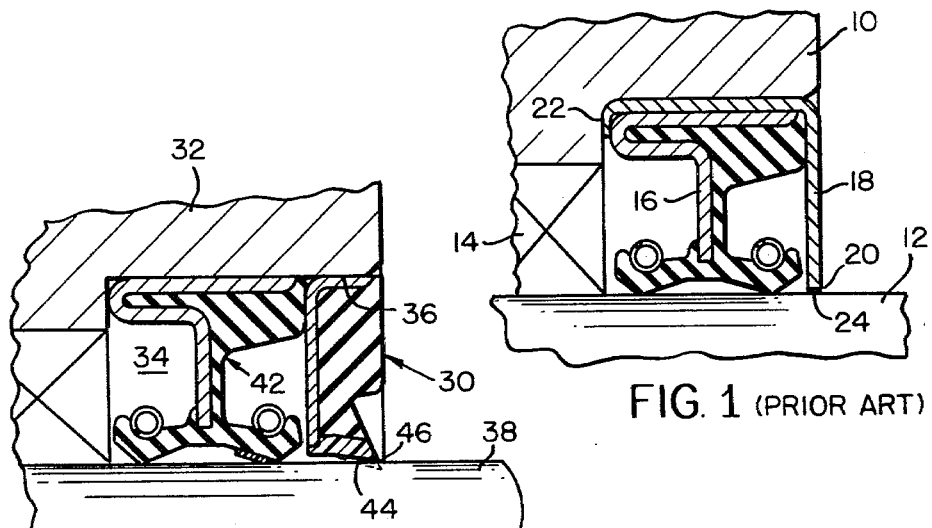
FIG. 1 is a partial cross-sectional view through a prior art linecutter.

With reference now to the drawings, FIG. 1 shows a known linecutter and seal arrangement including a marine engine housing 10, a shaft 12, a bearing 14, a propshaft seal 16, and a metal linecutter 18 having a cutting edge 20. The linecutter 18 is cup-shaped and the propshaft seal 16 is pressed into the linecutter and held by a crimped edge 22. The inside diameter surface 24 of the linecutter is ground to produce the sharp edge 20 and to achieve a minimal shaft clearance with an exceptionally tight tolerance of about ±0.0005–0.0010 inch.

Figure 2:
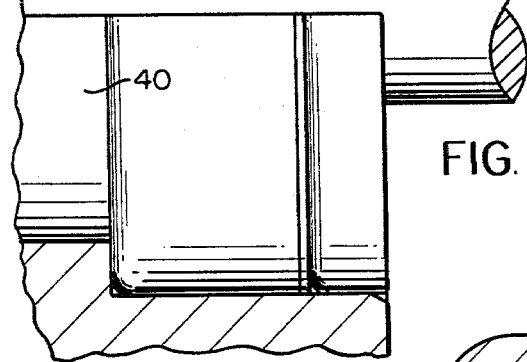
FIG. 2 is a partial cross-sectional view showing the linecutter of the present invention in combination with a marine engine housing, shaft and primary seals.

FIG. 2 shows a linecutter 30 according to the present invention, installed in a marine engine housing 32 having a bore 34, defined by a bore wall 36, through which bore a propshaft 38 extends, a bearing 40, a propshaft seal 42 and the linecutter 30.

The linecutter 30 has an inside diameter shaft-contacting surface 44 and a cutting edge 46 in contact with the shaft. FIG. 2 also shows, in dotted lines, the as-molded shape of the linecutter 30, showing that the linecutter is designed with a certain amount of interference with the shaft. As shown in FIG. 2, both the seal 42 and the linecutter 30 form a press-fit with the bore wall 36.

Figure 3:
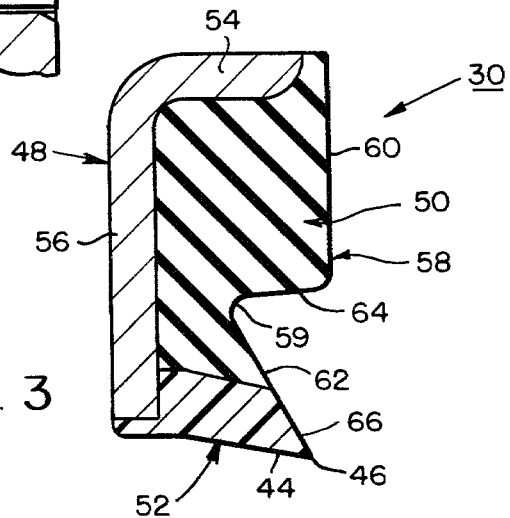
FIG. 3 is an enlarged partial cross-sectional view of the linecutter of the present invention.

For purposes of the present specification and claims, the term "axially inner" means the oil side, or to the left in FIGS. 1–3, and "axially outer" means the water side or to the right in FIGS 1–3.

Referring now to FIG. 3, the linecutter 30 includes an annular metal shell 48, a molded elastomeric body 50 and a liner or ring 52 of ultra high molecular weight polyethylene. The linecutter 30 is preferably made by a known molding process (as will be understood by anyone skilled in the art) in which all three of the shell, elastomeric preform, and ring are placed in a mold cavity; the mold is then closed molding the body to the desired shape from the preform, forming the ring to the desired shape from a flat ring tube or washer, and bonding the three parts together.

The shell 48 includes a cylindrical portion 54 and a radial flange 56 extending radially inwardly from the axially inner end of the cylindrical portion. The outside diameter surface of the cylindrical portion 54 is designed and adapted to form a press-fit in the bore wall 36. The shell is preferably type 302/304 stainless, and in one embodiment is 0.030 inches thick (#22 gauge), having a pierce of about 0.655 inches and a width of 0.128 inches.

The molded elastomeric body 50 is bonded to the cylindrical portion 54 and to the radial flange 56 and is located radially inwardly of the cylindrical portion and axially outwardly of the radial flange. The body 50 has an axially outer radial surface 58 including a radially outer radial portion 60, a radially inner tapered portion 62, and a cylindrical portion 64. The radial surface 58 thus has an outwardly facing groove 59 which provides a desired amount of flexibility to the ring 52. The radial surface 58 is located axially outwardly of the edge 46 in their as-molded shape. The preferred elastomer is nitrile.

The liner or ring 52 is bonded to the radially inner, generally cylindrical surface of the elastomeric body. The ring 52 includes an axially outer radial surface 66 that forms an acute angle with the annular inside diameter shaft-contacting surface 44 thus forming the sharp linecutter edge 46. The sharp cutting edge 46 can be formed during molding via pinchoff, or it can be trimmed after molded. Preferably it is formed by pinch-off during molding. The ring 52 is formed to its desired shape during molding. The acute angle is most preferably about 50°, however, it can be any acute angle less than 90°, but preferably is in the range of from about 30°–70°. The ring 52 is preferably made of an ultra-high molecular weight polyethylene. The ring 52 must be tough enough to cut nylon fishing line, abrasion resistant and is also preferably flexible enough to follow shaft runout. While ultra-high molecular weight (2,000,000 to 6,000,000) polyethylene (see pages 66–68 of "Modern Plastics Encyclopedia", 1980–81 Edition (McGraw-Hill, New York, 1980) is preferred, other equivalent tough, low coefficient of friction, abrasion-resistant materials can be used including various plastics, such as glass-filled nylon.

In the as-molded shape of the linecutter 30, the inside diameter surface 44 makes an acute angle of about 10° to the linecutter axis, while the radial surface 66 makes an acute angle of about 60° to the linecutter axis.

In one preferred embodiment, the ring 52 as formed in the mold had an interference of about 0.010 inch with the shaft 38, which had a diameter of 0.6245 inch. The linecutter 30 outside diameter was 1.128 inch, the axial length of the linecutter was 0.143 inch, the radial clearance between the shaft and the axially inner end of the inside diameter surface 44 of the ring 52 was 0.005 inch, and the axially inner end of the ring 52 was cylindrical for 0.045 inches before it started to taper radially inwardly toward the shaft. The axial length of the linecutter was 0.130 inches. The radial distance from the shaft to the cylindrical portion 64 of the surface 58 was 0.100 inch.

The invention has been described in detail with particular reference to the preferred embodiments thereof, but it will be understood that variations and modifications can be affected within the spirit and scope of the invention as described hereinafter and as defined in the appended claims. For example, the linecutter 30 can be used in other assemblies than that shown in FIG. 2, and with other types of seals. One such example would be an apparatus in which the linecutter also performs a principal sealing function and the axially outwardly facing lip of FIG. 2 is omitted. Further, the linecutter and the seal may be united within a unitary structure. Such a unitary structure can be made with a separate unifying shell or by an extension of the shell of the seal or the shell of the linecutter to retain both members. Further, other shapes for the shell 48 and the body 50 can be used, and in fact one or both of these can be omitted with other means substituted therefore for holding the ring 52 in place. The linecutter 30, is, of course, not limited in use to cutting fishing line and is not limited to use in marine engines. For example, this invention can be applied in a disk harrow to exclude "lines" such as cornstalks or vines. The term "line" is defined for use in the present specification and claims as meaning any of various elongated materials that might tend to wrap around a shaft, such as and including fishing line, grass, cornstalks, vines and the like.

I claim:

1. A linecutter seal comprising:
   (a) an annular metal shell including a cylindrical portion and a radial flange extending radially inwardly from the axially inner end of said cylindrical portion, said cylindrical portion having an outside diameter adapted to press-fit in a housing bore;
   (b) a molded elastomeric body bonded to said cylindrical portion and to said radial flange, said body being located radially inwardly of said cylindrical portion and axially outwardly from said radial flange; and
   (c) an annular ring of tough, low coefficient of friction, abrasion-resistant material tough enough to cut nylon fishing line, said ring being bonded to the radially inner generally cylindrical surface of said elastomeric body, said ring having an annular inside diameter shaft contacting surface that in its free, formed shape, tapers radially inwardly and axially outwardly, said ring also having an axially outer radial surface that forms an acute angle with said annular inside diameter surface, said shaft contacting surface and said radial surface of said ring meeting at a sharp linecutter edge.

2. The seal as recited in claim 1 wherein said ring material is ultra-high molecular weight polyethylene.

3. The seal as recited in claim 2 wherein said acute angle is in the range of from about 30° to 70°.

4. The seal as recited in claim 2 wherein said shaft contacting surface is at an angle of about 10° to the axis of said seal.

5. The seal as recited in claim 2 wherein said body has an axially outer radial surface having a radially outer radial portion positioned axially outwardly of said linecutter edge, a radially inner tapered portion in-line with said radial surface of said ring, and a substantially cylindrical portion joining said radial portion and said tapered portion.

6. The seal as recited in claim 1 wherein said acute angle is approximately 50°.

7. The seal as recited in claim 6 wherein said ring material is ultra-high molecular weight polyethylene.

8. The seal as recited in claim 7 wherein said shaft contacting surface is at an angle of about 10° to the axis of said seal.

9. Apparatus comprising:
   (a) a shaft, a housing having a bore, defined by a bore wall, through which bore said shaft extends and an annular space between said bore wall and said shaft;
   (b) a shaft seal located in said annular space for sealing said space against the passage of fluids therethrough; and
   (c) a linecutter seal located in said space axially outwardly from said shaft seal, and comprising an annular ring of tough, low coefficient of friction abrasion-resistant material tough enough to cut nylon fishing line, having an annular inside diameter shaft contacting surface in contact with said shaft, said ring having an axially outer radial surface that forms an acute angle with said annular inside diameter surface of said ring, said annular inside diameter surface and said radial surface of said ring meeting at a sharp linecutter edge.

10. The apparatus as recited in claim 9 wherein said ring material is ultra-high molecular weight polyethylene.

11. The apparatus as recited in claim 10 wherein said acute angle is in the range of from about 30° to 70°.

12. The apparatus as recited in claim 10 wherein said body has an axially outer radial surface having a radially outer radial portion positioned axially outwardly of said linecutter edge, a radially inner tapered portion in-line with said radial surface of said ring, and a substantially cylindrical portion joining said radial portion and said tapered portion.

13. The apparatus as recited in claim 9 wherein said acute angle is approximately 50°.

14. The apparatus as recited in claim 13 wherein said ring material is ultra-high molecular weight polyethylene.

15. The apparatus as recited in claim 13 wherein said body has an axially outer radial surface having a radially outer radial portion positioned axially outwardly of said linecutter edge, a radially inner tapered portion in-line with said radial surface of said ring, and a substantially cylindrical portion joining said radial portion and said tapered portion.

16. The apparatus as recited in claim 9 wherein said linecutter seal includes:
    (a) an annular metal shell including a cylindrical portion and a radial flange extending radially inwardly from the axially inner end of said cylindrical portion, said cylindrical portion having an outside diameter that is a press-fit in said bore wall,
    (b) a molded elastomeric body bonded to said cylindrical portion and to said radial flange, said body being located radially inwardly of said cylindrical portion and axially outwardly from said radial flange; and wherein
    (c) said ring is bonded to the radially inner surface of said elastomeric body, said annular inside diameter surface of said ring, in its free, as-formed shaped, tapering radially inwardly and axially outwardly.

17. The apparatus as recited in claim 16 wherein said ring material is ultra-high molecular weight polyethylene.

18. The apparatus as recited in claim 17 wherein said acute angle is in the range of from about 30° to 70°.

19. The apparatus as recited in claim 18 wherein said acute angle is approximately 50°.

20. A method for protecting a shaft seal of a shaft extending through a bore defined by a bore wall in a housing comprising mounting, in said wall of said housing bore axially outwardly from said shaft seal, a linecutter seal including an annular ring of tough, low coefficient of friction, abrasion-resistant material tough enough to cut nylon fishing line, and having an annular inside diameter shaft contacting surface in contact with said shaft, said ring having an axially outer radial surface that forms an acute angle with said annular inside diameter surface of said ring, said annular inside diameter surface and said radial surface of said ring meeting at a sharp linecutter edge.

21. The method as recited in claim 20 wherein said ring material is ultra-high molecular weight polyethylene.

22. The method as recited in claim 21 wherein said acute angle is in the range of from about 30° to 70°.

23. The method as recited in claim 22 including positioning said radial surface of said ring at an acute angle of about 50° to the surface of said shaft.

24. The method as recited in claim 21 including bonding said ring to an elastomeric body positioned radially outwardly of said ring for providing a resilient force urging said linecutter edge into contact with said shaft.

* * * * *